United States Patent
Gorilovskiy et al.

(10) Patent No.: US 9,920,861 B2
(45) Date of Patent: Mar. 20, 2018

(54) MULTILAYER REINFORCED POLYMERIC PIPE AND SYSTEM OF PIPES FOR WATER TRANSPORTATION

(71) Applicant: OBSCHESTVO S OGRANICHENNOY OTVETSTVENNOSTYU "GRUPPA POLYMERTEPLO", Moscow (RU)

(72) Inventors: Miron Isaakovich Gorilovskiy, Moscow (RU); Vladimir Vasilyevich Shvabauer, Moscow (RU); Aleksandr Yuryevich Shmelev, Moscow (RU); Vladislav Vitalyevich Kovriga, Moscow (RU); Sergey Vasilyevich Samoilov, Moscow (RU); Igor Vasilyevich Gvozdev, Moscow (RU)

(73) Assignee: Obschestvo S Ogranichennoy Otvetstvennostyu "Gruppa Polymerteplo", Moscow (RU)

( * ) Notice: Subject to any disclaimer, the term of this patent is extended or adjusted under 35 U.S.C. 154(b) by 0 days.

(21) Appl. No.: 13/857,671

(22) Filed: Apr. 5, 2013

(65) Prior Publication Data

US 2013/0263962 A1  Oct. 10, 2013

Related U.S. Application Data

(63) Continuation of application No. PCT/RU2011/000788, filed on Oct. 7, 2011.

(30) Foreign Application Priority Data

Oct. 7, 2010  (RU) .................. 2010141067

(51) Int. Cl.
*F16L 11/00* (2006.01)
*F16L 9/12* (2006.01)
(Continued)

(52) U.S. Cl.
CPC ................ *F16L 9/123* (2013.01); *B32B 1/08* (2013.01); *B32B 5/028* (2013.01); *B32B 7/12* (2013.01);
(Continued)

(58) Field of Classification Search
USPC .................................................. 138/125, 132
See application file for complete search history.

(56) References Cited

U.S. PATENT DOCUMENTS 2,690,769 A * 10/1954 Brown ................. B29D 23/001
138/125
3,604,461 A * 9/1971 Matthews ............. F16L 11/083
138/115
(Continued)

FOREIGN PATENT DOCUMENTS

CA  2753024 A1  9/2010
CN  1568411 A  1/2005
(Continued)

OTHER PUBLICATIONS

International Opinion on Patentability dated Feb. 24, 2012 issued in related International Application PCT/RU2011/000788 and English translation thereof (7 pages).
(Continued)

*Primary Examiner* — James Hook
(74) *Attorney, Agent, or Firm* — Hoffman & Baron, LLP

(57) ABSTRACT

The invention relates to the design of a multilayer reinforced polymeric pipe. The multilayer reinforced polymeric pipe comprises a polymeric base layer, at least one barrier layer, at least one reinforcing layer, an adhesive layer and a protective layer. The adhesive layer is made from a material which does not adhere to a material of the reinforcing layer and forms channels for the reversible movement of the fibers of the reinforcing layer. The reinforcing layer is made of
(Continued)

high-strength and high-modular polymeric fibers, preferably aramid, polyester, or polyethylene fibers. The barrier layer is made of polar and nonpolar polymers. The protective layer is made of polyethylene of medium density. A system of pipes for transportation of water, preferably hot water in district heating and water supply networks, consisting of two or more multilayer reinforced polymeric pipes.

14 Claims, 2 Drawing Sheets

(51) Int. Cl.
| | |
|---|---|
| B32B 1/08 | (2006.01) |
| F16L 11/08 | (2006.01) |
| B32B 5/02 | (2006.01) |
| B32B 27/12 | (2006.01) |
| B32B 27/32 | (2006.01) |
| B32B 7/12 | (2006.01) |
| F16L 11/04 | (2006.01) |

(52) U.S. Cl.
CPC .............. *B32B 27/12* (2013.01); *B32B 27/32* (2013.01); *F16L 9/12* (2013.01); *F16L 11/085* (2013.01); *B32B 2262/0253* (2013.01); *B32B 2262/0269* (2013.01); *B32B 2262/0276* (2013.01); *B32B 2597/00* (2013.01); *F16L 2011/047* (2013.01); *F24D 2220/0285* (2013.01); *Y02E 20/14* (2013.01)

(56) References Cited

U.S. PATENT DOCUMENTS

| | | | | | |
|---|---|---|---|---|---|
| 3,828,112 | A | * | 8/1974 | Johansen et al. ................ 174/47 |
| 3,866,632 | A | * | 2/1975 | Schaffer ................ B29C 47/023 |
| | | | | | 138/125 |
| 3,924,632 | A | * | 12/1975 | Cook ................... A61M 25/005 |
| | | | | | 138/125 |
| 3,945,867 | A | * | 3/1976 | Heller et al. ................... 156/143 |
| 3,977,440 | A | * | 8/1976 | Phillippi ........................ 138/125 |
| 4,098,298 | A | * | 7/1978 | Vohrer ................... F16L 11/112 |
| | | | | | 138/122 |
| 4,104,095 | A | * | 8/1978 | Shaw ........................ B29C 70/82 |
| | | | | | 138/125 |
| 4,142,554 | A | * | 3/1979 | Washkewicz ......... F16L 11/086 |
| | | | | | 138/109 |
| 4,212,327 | A | * | 7/1980 | Haren et al. ................... 138/125 |
| 4,273,160 | A | * | 6/1981 | Lowles ................. F16L 11/088 |
| | | | | | 138/124 |
| 4,341,578 | A | * | 7/1982 | Chermak .............. B29C 47/023 |
| | | | | | 156/149 |
| 4,347,090 | A | * | 8/1982 | Anderson ............. B29B 13/024 |
| | | | | | 138/125 |
| 4,357,962 | A | * | 11/1982 | Shaw et al. .................... 138/125 |
| 4,447,378 | A | * | 5/1984 | Gray et al. .................... 264/45.9 |
| 4,759,388 | A | * | 7/1988 | Kiyama ................ F16L 11/082 |
| | | | | | 138/126 |
| 4,862,923 | A | * | 9/1989 | Kitami et al. ................. 138/125 |
| 4,907,624 | A | * | 3/1990 | Jonasson ....................... 138/125 |
| 4,952,262 | A | * | 8/1990 | Washkewicz ....... B29C 47/0016 |
| | | | | | 138/125 |
| 5,732,746 | A | * | 3/1998 | Leroy et al. ................... 138/123 |
| 6,179,008 | B1 | * | 1/2001 | Kawazura et al. ............ 138/125 |
| 6,397,894 | B2 | * | 6/2002 | Leray et al. ................... 138/125 |
| 6,629,547 | B1 | * | 10/2003 | Yamaguchi et al. .......... 138/129 |
| 2001/0008150 | A1 | * | 7/2001 | Leray ...................... F16L 9/121 |
| | | | | | 138/125 |
| 2003/0049400 | A1 | | 3/2003 | Smith et al. |
| 2004/0154676 | A1 | * | 8/2004 | Wilkinson .................... 138/125 |
| 2005/0189029 | A1 | * | 9/2005 | Quigley ................ F16L 11/082 |
| | | | | | 138/125 |
| 2005/0199308 | A1 | * | 9/2005 | Swails .................. F16L 11/088 |
| | | | | | 138/109 |
| 2005/0199309 | A1 | | 9/2005 | Kamiyama |
| 2008/0006337 | A1 | * | 1/2008 | Quigley .................... F16L 9/19 |
| | | | | | 138/125 |
| 2008/0187701 | A1 | * | 8/2008 | Dabouineau ................ 428/36.91 |
| 2008/0302437 | A1 | * | 12/2008 | Lovett et al. ................. 138/125 |
| 2009/0308475 | A1 | * | 12/2009 | Stringfellow ......... B29C 63/343 |
| | | | | | 138/98 |
| 2010/0032047 | A1 | * | 2/2010 | Mennig et al. ............... 138/125 |
| 2011/0162749 | A1 | * | 7/2011 | Jeong .................... F16L 11/085 |
| | | | | | 138/125 |
| 2013/0061974 | A1 | * | 3/2013 | Oyaizu et al. ................ 138/126 |

FOREIGN PATENT DOCUMENTS

| | | |
|---|---|---|
| CN | 1656333 A | 8/2005 |
| CN | 201386865 Y | 1/2010 |
| EA | 004977 B1 | 10/2004 |
| RU | 2205318 C2 | 5/2003 |
| RU | 2224160 C2 | 2/2004 |
| RU | 59190 U1 | 12/2006 |
| RU | 2293897 C1 | 2/2007 |
| RU | 2383809 C1 | 3/2010 |
| WO | WO 99/19659 A1 | 4/1999 |

OTHER PUBLICATIONS

International Search Report dated Feb. 24, 2012 issued in related International Application PCT/RU2011/000788 and English translation thereof (2 pages).

English Abstract of Technical Specification No. 2248-025-40270293-2005 of the Russian Federation (1 page).

* cited by examiner

MULTILAYER REINFORCED POLYMERIC PIPE AND SYSTEM OF PIPES FOR WATER TRANSPORTATION

CROSS-REFERENCE TO RELATED APPLICATIONS

This application is a Continuation of International Application No. PCT/RU2011/000788, filed on Oct. 7, 2011, which claims the benefit of Russian Application No. RU2010141067, filed Oct. 7, 2010, the entire content of each of which is incorporated herein by reference.

BACKGROUND

1. Field of the Invention

The invention relates to the design of a multilayer reinforced polymeric pipe for water, namely, for hot water in district heating and hot water supply systems, and may be used in pipes for transportation of liquid and gaseous media to which the pipe material is resistant in operation conditions.

2. Background Art

There is known a polymeric reinforced pipe comprising an inner and an outer layers of thermoplastic material, and a reinforcing agent of polymeric or mineral material, placed between the said layers and made in the form of continuous fibers which penetrate into outside surface of the inner layer and inner surface of the outer layer (RU, No. 2205313, IPC 7 F 16 L 9/12).

Such a design provides considerable increase of the pipe strength, but it is unsuitable for hot water transportation, because there is no barrier for vapor and gas permeability. Moreover, providing pipe strength requires good adhesion of the reinforcing layer to polymer.

There is known a multilayer pipe for water and heat supply systems, including a pipe body preferably consisting of cross-linked polyethylene, at least one layer forming a barrier against water diffusion through the multilayer pipe, the barrier layer consisting of liquid-crystal polymer (RU, No. 2224160, IPC 7 F 16 L 9/12).

At present such a design is widely used in water and heat supply systems, preferably for hot water supply. However, absence of a reinforcing layer does not allow to provide a required level of continuous strength in increased pressure during operation and results in the need to increase the pipe wall thickness, which, in its turn, causes increase of the pipe mass and decrease of its flexibility and capacity.

Thus, for example, while for pipes of cross-linked polyethylene, used for hot water supply at the pressure of 10 bars, a safety factor is 1,53, for reinforced pipes of the same material a safety factor is 1,78.

Of all known pipes, the closest to the proposed pipe in its technical essence is a polymeric multilayer reinforced pipe "G-PEX-AM" produced under TU 2248-025-40270293-2005, which design includes a pipe of cross-linked polyethylene (PEX-A), a barrier layer against oxygen diffusion, a reinforcing layer formed by synthetic fiber ("Kevlar" mesh surrounding the barrier layer, an adhesive layer applied on the reinforcing layer, and an outer protective layer made of polyethylene of medium density.

In this design there is provided a double-face adhesion of the reinforcing layer formed by synthetic fiber mesh, to both the barrier layer and the outer protective layer, for the purpose of stabilization of the reinforcing fibers position.

Availability of the double-face adhesion of the reinforcing layer may cause damage of polymeric surfaces directly adjoining the reinforcing layer, as a result of axial displacement thereof under the effect of cyclic changes in temperature and mechanical load.

SUMMARY

A technical task of the proposed pipe design is providing possibility of axial displacement of reinforcing fibers inside the pipe structure under the effect of cyclic changes in temperature and mechanical load, while maintaining the mesh structure and preventing damage to the polymeric layers of the pipe, which surround the reinforcing layer.

In accordance with an embodiment, a multilayer reinforced polymeric pipe is provided. The pipe includes a base layer, a protective layer, a reinforcing layer, and an adhesive layer.

The reinforcing layer is disposed between the base layer and the protective layer. The reinforcing layer includes a mesh structure. Moreover, the mesh structure includes reinforcing fibers having longitudinal axes, wherein the reinforcing fibers include aramid or polyester.

The adhesive layer extends through the mesh structure of the reinforcing layer and adheres to layers surrounding the reinforcing layer, wherein the layers include polyethylene. Moreover, the adhesive layer forms channels about the reinforcing fibers of the mesh structure so that the reinforcing fibers are capable of reversible axial displacement in the channels along the longitudinal axes with respect to the layers surrounding the reinforcing layer, while maintaining the mesh structure of the reinforcing layer and preventing damage to the layers surrounding the reinforcing layer.

DETAILED DESCRIPTION

The technical result is achieved in the proposed multilayer reinforced polymeric pipe which includes a base polymeric layer, at least one barrier layer, at least one reinforcing layer, an adhesive layer and a protective layer, the adhesive layer being made of material which does not adhere to material of the reinforcing layer and forms channels for free movement of the reinforcing layer fibers.

In the proposed pipe design the reinforcing layer fibers are capable of free and reversible axial displacement at fluctuations of the pipe size under the effect of changes in temperature and mechanical load.

The base polymeric layer of the proposed pipe is made of cross-linked or heat-resistant polymer, preferably of polyethylene or polybutene.

The reinforcing layer of the pipe is made of high-strength and high-modular polymeric fibers, preferably aramid, polyester, or polyethylene fibers. The reinforcing layer may consist of a mesh. It may be made by overlapping a few sequential layers of the mesh.

The barrier layer providing resistance to oxygen diffusion and water vapors is made of polar and nonpolar polymers.

The protective layer of the pipe is made of polyethylene of medium density. Thickness of the protective layer is at least 3 mm.

There is proposed a pipe system for transportation of water, preferably hot water, in district heating and water supply networks, consisting of two or more multilayer reinforced polymeric pipes of the proposed design.

Distinctions of the proposed design consist in that the barrier layer of the pipe is meshed with the reinforcing layer made of polymeric fibers, over the reinforcing layer there is applied the adhesive layer made of material which does not adhere to the reinforcing layer and forms channels for fibers of the reinforcing layer to be capable of free and reversible axial displacement at fluctuations of the pipe size under the effect of changes in temperature and mechanical load.

Figure 1:
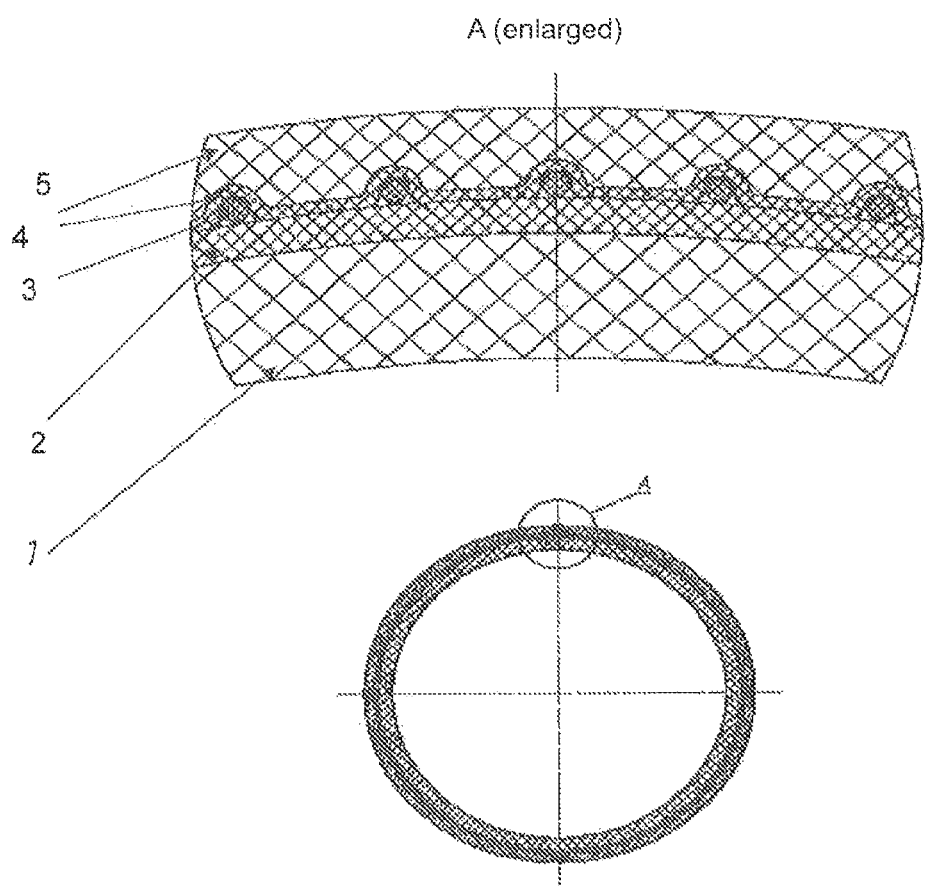
FIG. 1 shows a general view of a multilayer reinforced polymeric pipe for water transportation.
Figure 2:
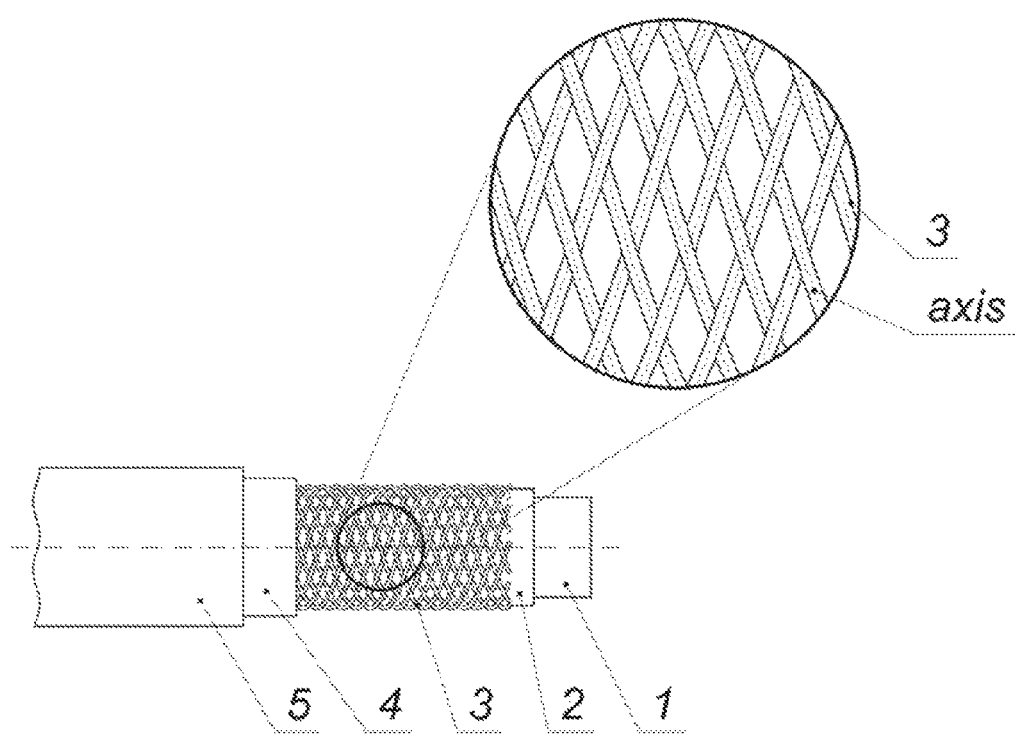
FIG. 2 shows a mesh structure of a reinforcing layer shown in FIG. 1.

FIGS. 1 and 2 show a general view of the pipe under the invention.

The multilayer polymeric reinforced pipe contains a polymeric base layer (1), a barrier layer (2) against oxygen diffusion and water vapors, a reinforcing layer (3), an adhesive layer (4) which adheres to the pipe layers, except the reinforcing layer, and a protective layer (5).

The multilayer polymeric reinforced pipe operates in the following way. Installation of a pipeline using a pipe of the proposed design is usually carried out under a scheme including rotations at different angles. When the pipe flexes, the reinforcing fibers and the base layer are displaced with respect to each other. After installation of the pipeline it is tested by increased pressure, when some change of the pipe sizes (its diameter and length) takes place. In course of the size change the pipe polymeric layers are displaced with respect to the reinforcing layer fibers as a result of different modulus of elasticity of the reinforcing layer material and the base layer material. After completion of the testing the testbed pressure is relieved, and reverse displacement of the reinforcing fibers with respect to the polymeric layer takes place. As a result of supply of a heat carrier (hot water), in course of transportation thereof and stoppage of the supply there takes place the same reversible displacement of the reinforcing fibers and the polymeric layers with respect to each other.

The multilayer reinforced polymeric pipe under the invention provides free and reversible displacement of the polymeric layers and the reinforcing fibers with respect to each other in course of installation, test and operation thereof, which ensures a high level and stability of its operating characteristics during the working life.

The invention claimed is:

1. A multilayer reinforced polymeric pipe comprising:
    a base layer;
    a protective layer;
    a reinforcing layer disposed between the base layer and the protective layer, the reinforcing layer comprising a mesh structure, the mesh structure comprising reinforcing fibers having longitudinal axes, the reinforcing fibers comprising aramid or polyester; and
    an adhesive layer that extends through the mesh structure of the reinforcing layer and adheres to layers surrounding the reinforcing layer, the layers comprising polyethylene, wherein the adhesive layer as adhered to the layers surrounding the reinforcing layer forms channels about the reinforcing fibers of the mesh structure so that the reinforcing fibers are capable of reversible axial displacement in the channels along the longitudinal axes with respect to the layers surrounding the reinforcing layer, while maintaining the mesh structure of the reinforcing layer and preventing damage to the layers surrounding the reinforcing layer.

2. The multilayer pipe of claim 1, wherein the polyethylene of the base layer is cross-linked or heat-resistant.

3. A system of pipes for transportation of water, the system comprising at least two multilayer pipes as recited in claim 2.

4. The multilayer pipe of claim 1, further comprising a barrier layer.

5. A system of pipes for transportation of water, the system comprising at least two multilayer pipes as recited in claim 4.

6. The multilayer pipe of claim 4, wherein the barrier layer comprises polar and nonpolar polymers.

7. A system of pipes for transportation of water, the system comprising at least two multilayer pipes as recited in claim 6.

8. The multilayer pipe of claim 1, wherein the reinforcing fibers of aramid or polyester are high-strength and high-modular.

9. A system of pipes for transportation of water, the system comprising at least two multilayer pipes as recited in claim 8.

10. The multilayer pipe of claim 1, wherein the protective layer comprises polyethylene of medium density.

11. A system of pipes for transportation of water, the system comprising at least two multilayer pipes as recited in claim 10.

12. The multilayer pipe of claim 1, wherein a thickness of the protective layer is at least 3 mm.

13. A system of pipes for transportation of water, the system comprising at least two multilayer pipes as recited in claim 12.

14. A system of pipes for transportation of water, the system comprising at least two multilayer pipes as recited in claim 1.

* * * * *